Oct. 13, 1925.  
C. E. WILSON  
1,557,226  
IGNITION TIMER ADJUSTMENT  
Filed Dec. 9, 1921
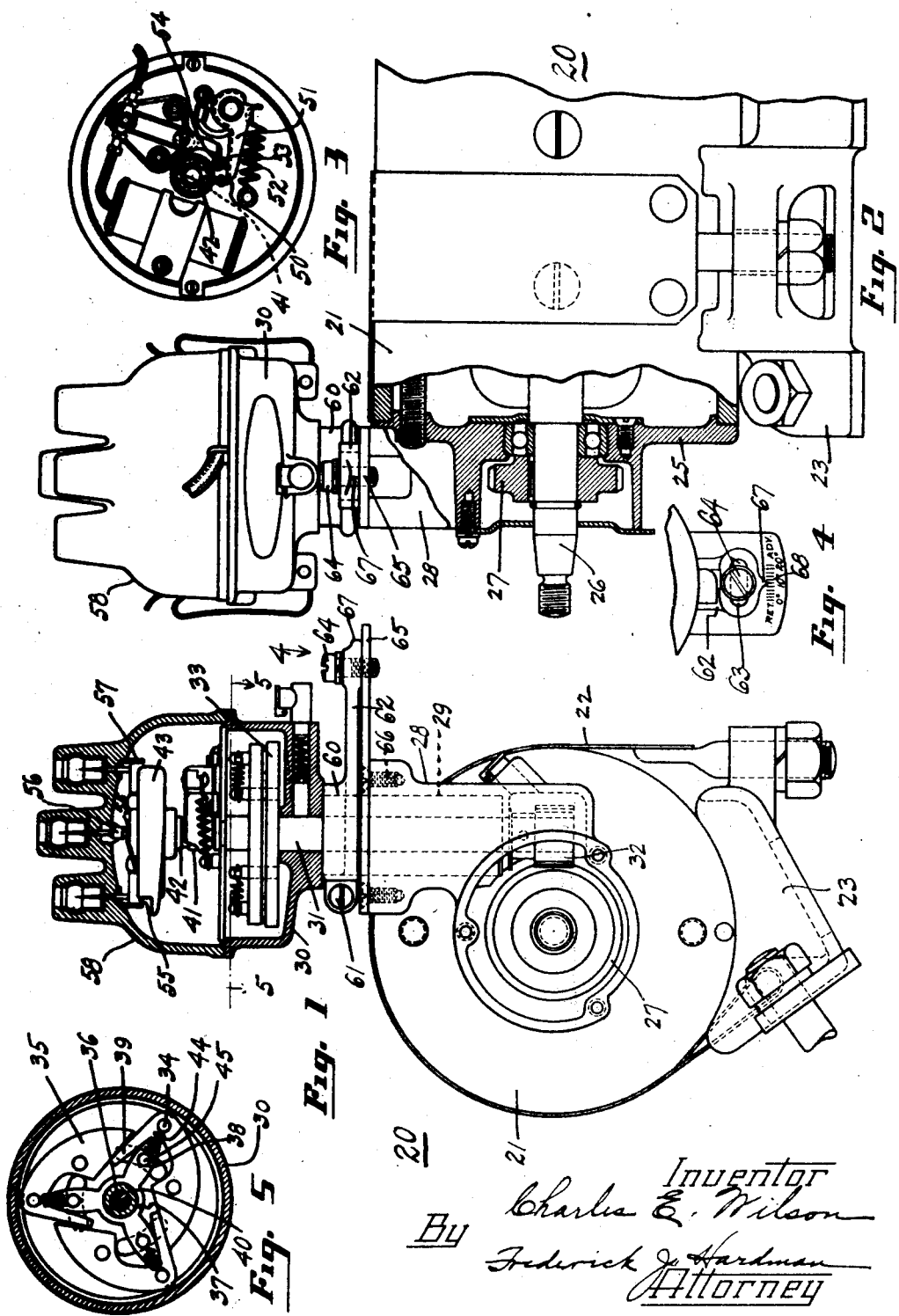

Patented Oct. 13, 1925.

1,557,226

UNITED STATES PATENT OFFICE.

CHARLES E. WILSON, OF ANDERSON, INDIANA, ASSIGNOR, BY MESNE ASSIGNMENTS, TO GENERAL MOTORS CORPORATION, OF DETROIT, MICHIGAN, A CORPORATION OF DELAWARE.

IGNITION-TIMER ADJUSTMENT.

Application filed December 9, 1921. Serial No. 521,234.

*To all whom it may concern:*

Be it known that I, CHARLES E. WILSON, a citizen of the United States of America, residing at Anderson, county of Madison, State of Indiana, have invented certain new and useful Improvements in Ignition-Timer Adjustments, of which the following is a full, clear, and exact description.

This invention relates to ignition apparatus for internal combustion engines and particularly for use with automobiles. Such ignition apparatus usually includes an ignition timer which is controlled in some suitable manner so that sparking will occur substantially at the proper time in the engine. Ignition timers have been provided with devices responsive to the speed of the engine for controlling the timing of the spark and also means for controlling the ignition which usually includes a hand lever operated from the driver's seat.

The present invention contemplates omitting the manual control from the driver's seat and providing only the automatic control of the timer, and the present invention has among its objects the provision of means for securing the timer in adjusted position by means which is out of control of the operator from the driver's seat. The advantage of this feature of the invention is that the timer may be adjusted by experts so that the range of operation of the automatic control will result in the most efficient operation of the engine. Another advantage resulting from my invention is the elimination from the automobile and particularly from the steering wheel and steering column, of mechanism for operating the ignition timer from the driver's seat.

Other and further objects and advantages of the present invention will be apparent from the following description, reference being had to the accompanying drawings, wherein a preferred embodiment of the present invention is clearly shown.

In the drawings:

Fig. 1 is an end view of a generator unit embodying the present invention, a portion of the ignition apparatus being shown in section.

Fig. 2 is a side elevation of the same, a portion of the generator being shown in section;

Fig. 3 is a plan view of the ignition timer, the distributor head and the distributor rotor being removed;

Fig. 4 is a fragmentary plan view of a portion of the adjusting apparatus looking in the direction of the arrow 4 of Fig. 1; and Fig. 5 is a sectional view of the timer shown in Fig. 1, the section being taken on the line 5—5 of Fig. 1.

Referring to the drawings, 20 designates as a whole, the generator ignition unit which includes a generator 21, secured by means of a strap 22 to a bracket 23 by means of which the unit 20 may be secured in any suitable manner to a portion of the automobile engine or frame. Generator 21 includes an end frame 25 which rotatably supports the armature shaft 26 carrying a spiral gear 27. End frame 25 includes an extension 28 which is bored out to provide a journal for the shank 29 of the ignition timer housing 30, it being understood that housing 30 is rotatably supported by the end frame extension 28.

Timer shaft 31 is journalled within the shank 29 of housing 30 and carries at its lower end a spiral gear 32 meshing with gear 27, and adjacent its upper end a disc 33 carrying studs 34 upon which weight elements 35 are pivoted. Shaft 31 has its upper end reduced at 36 to provide a support for the cam spider 37 which may rotate with the shaft 31 but have relative movement with respect to the shaft end 36. This spider includes a plurality of arms 38 for engaging the tails 39 of the weights 35, and a shank 40 having formed integral therewith a cam 41 and a support 42 for a distributor rotor 43. Normally the cam support and weights 35 are maintained in the position shown in Fig. 5 by means of springs 44 attached at one end to studs 34 and at the other to studs 45 carried by the spider arms. It will readily be seen that as the speed of the shaft 31 increases, the weights 35 will move toward the wall of the housing 30 thereby causing the relative movement between the cam spider 37 and the shaft 31. In this manner the timer cam 41 is controll d in accordance with the speed of the engine. This form of ignition control is more particularly described and claimed in the patent to Oliver F. Conklin, No. 1,463,197, issued July 31, 1923.

The cam 41 cooperates with a rubbing block 50 on the end of a lever 51 which operates by the aid of a spring 52 to maintain contacts 53 and 54 normally in engagement. In the well known manner of operation of closed circuit ignition apparatus, the separation of the contacts 53 and 54 will produce an electric spark.

The distributor rotor 43 carries a conductor 55 for distributing sparking impulses from a center contact 56 to one of a series of contacts 57. These contacts 56 and 57 are supported by a distributor head 58 providing an enclosure for the rotor 43 and the ignition timing apparatus just described.

The form of ignition timer is described and claimed in the patent to O. F. Conklin and John Vanneman, No. 1,503,483, issued August 5, 1924; and the distributor head just described is more particularly described and claimed in the patent to O. F. Conklin, No. 1,372,065, issued March 22, 1921.

It will be apparent that since the timer housing 30 may rotate within the frame extension 28 that relative movement between housing 30 and shaft 31 may be produced. It is desirable that the housing 30 should be secured in some position relative to a stationary member so that the range of operation of the automatic ignition controller will be most effective for the efficient operation of the engine. To accomplish this I have provided a split collar 60 which may be clamped around the shank 29 of the housing 30 in various positions of adjustment by means of a screw 61. An arm 62 extends integrally from the collar 61 and is provided with a slot 63 through which a clamping screw 64 may extend, said screw having threaded engagement with an index plate 65 secured upon the frame extension 28 by means of screws 66. A pointer 67 provided on the arm 62 cooperates with a scale or graduations 68 formed on the upper surface of the plate 65 for the purpose of indicating the amount of advance or retard.

After the generator ignition unit 20 has been installed upon the engine, the flywheel of the engine may be turned until it indicates a position of upper dead center of one of the cylinders. It is well known that generally the flywheels of internal combustion engines are provided with markings to indicate when any of the engine cylinders is brought to the upper dead center position. This having been done, pointer 67 is located beside the zero mark on the scale 68 and the screw 64 turned down to secure the arm 62 in this position. Then the screw 61 is loosened so that the timer housing 30 may rotate in order to bring the cam 41 and rubbing block 50 in such relative positions that the contact 51 just begins to separate from the contact 54. Then the screw 61 is tightened. The timer now is set in position of zero advance, that is, the spark will occur substantially at the upper dead center of the cylinder which should be fired at this instant. The engine is operated and the screw 64 is loosened to permit adjustment of the arm 62 in the best position for the efficient operation of the engine and the screw 64 is tightened to clamp the arm 62 in this position of adjustment. Then the operator of the automobile has no control whatever from the driver's seat of the timing of the ignition. The timing is controlled entirely by the automatic device. If it should be necessary on account of variations in engine operating conditions to relocate the arm 62, this may be done preferably by an expert.

It is therefore apparent from the foregoing description, that the present invention is advantageous since the complicated control mechanism for the manual control of the ignition apparatus has been eliminated, and the manually operated adjustment which has been substituted for the ordinary manual control from the driver's seat is entirely removed from the control of the driver while operating the car. Therefore much of the inefficient operation of automobile engines by inexperienced drivers has been eliminated.

While the form of mechanism herein shown and described constitutes a preferred form of embodiment of the invention, it is to be understood that other forms might be adopted, all coming within the scope of the claims which follow.

What I claim is as follows:

1. In an ignition timer, the combination with a housing carrying timer contacts and a housing support; of a lever for shifting said housing; means for attaching said lever to said housing in various positions of adjustment; and means for attaching said lever to the housing support in various positions of adjustment.

2. In an ignition timer, the combination with a frame member; of a timer housing journalled upon said frame; a lever for shifting said housing; means for securing said lever to said housing in various positions of adjustment; and means for attaching said lever to said frame in various positions of adjustment.

3. In an ignition timer, the combination with a frame member; of a timer housing having a tubular shank journalled in said frame member; a lever including a split collar portion surrounding said shank and an arm portion extending therefrom; a screw for tightening said collar portion about said shank in various positions of adjustment;

and means for attaching said arm to the frame in various positions of adjustment.

4. In an ignition timer, the combination with a frame member; and an indexing member extending therefrom; of a timer housing having a tubular shank journalled in said frame member; a lever including a split collar portion surrounding said shank and an arm portion extending therefrom; a screw for tightening said collar portion about said shank in various positions of adjustment; and a screw threaded into said indexing member and passing through an arcuate hole in said lever arm for attaching the lever to the indexing member in various positions of adjustment, said lever arm having a pointer cooperating with indicia on the indexing member.

In testimony whereof I hereto affix my signature.

CHARLES E. WILSON.